US012669676B2

(12) United States Patent
Yoshida

(10) Patent No.: US 12,669,676 B2
(45) Date of Patent: Jun. 30, 2026

(54) PRESSURE RETAINING MEMBER AND LASER SCANNING UNIT

(71) Applicant: KYOCERA Document Solutions Inc., Osaka (JP)

(72) Inventor: Shingo Yoshida, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 202 days.

(21) Appl. No.: 18/607,401

(22) Filed: Mar. 15, 2024

(65) Prior Publication Data

US 2024/0310603 A1    Sep. 19, 2024

(30) Foreign Application Priority Data

Mar. 17, 2023    (JP) ................................. 2023-042592

(51) Int. Cl.
| | |
|---|---|
| *G02B 7/182* | (2021.01) |
| *G02B 26/12* | (2006.01) |
| *G03G 15/04* | (2006.01) |

(52) U.S. Cl.
CPC ........... *G02B 7/182* (2013.01); *G02B 26/125* (2013.01); *G03G 15/04072* (2013.01)

(58) Field of Classification Search
CPC .... G02B 7/182; G02B 26/125; G02B 26/122; G02B 26/0875; G02B 7/021; G02B 26/10; G03G 15/04072; G03G 15/04036; G03G 15/0435; G03G 15/04; B41J 2/47; B41J 2/435; B41J 2/442
See application file for complete search history.

(56) References Cited

U.S. PATENT DOCUMENTS

| | | | | |
|---|---|---|---|---|
| 2007/0252890 A1* | 11/2007 | Kato | .................. | G03G 21/1666 |
| | | | | 347/241 |
| 2015/0002594 A1 | 1/2015 | Ishidate et al. | | |
| 2015/0049373 A1* | 2/2015 | Otoguro | ........... | G03G 15/04045 |
| | | | | 359/205.1 |
| 2015/0273862 A1* | 10/2015 | Aruga | ................ | G03G 15/0435 |
| | | | | 347/134 |

FOREIGN PATENT DOCUMENTS

| | | |
|---|---|---|
| JP | 2015011064 A | 1/2015 |
| JP | 2015075534 A | 4/2015 |

* cited by examiner

*Primary Examiner* — Kristal Feggins
(74) *Attorney, Agent, or Firm* — Alleman Hall LLP

(57) ABSTRACT

A pressure retaining member is formed by bending a metal plate. The pressure retaining member includes: a body portion supported by a housing; and two pressing portions which are connected to the body portion, can be elastically deformed, and press an optical element toward a retaining portion of the housing. One of the two pressing portions is formed with a restriction portion which restricts a depth with which the other one of the two pressing portions enters between the two pressing portions of another pressure retaining member or a depth with which the body portion of the another pressure retaining member enters between the two pressing portions.

7 Claims, 8 Drawing Sheets

PRESSURE RETAINING MEMBER AND LASER SCANNING UNIT

INCORPORATION BY REFERENCE

This application is based upon and claims the benefit of priority from the corresponding Japanese Patent Application No. 2023-042592 filed on Mar. 17, 2023, the entire contents of which are incorporated herein by reference.

BACKGROUND

The present disclosure relates to a pressure retaining member which presses and retains an optical member inside a laser scanning unit, and a laser scanning unit including the pressure retaining member.

A laser scanning unit used in an image forming apparatus radiates light onto an image-carrying member to form an electrostatic latent image. In the laser scanning unit, beam light emitted from a light source such as a laser diode passes through a collimator lens, a cylindrical lens, and an aperture and enters a deflector such as a polygon mirror.

After being deflected by the deflector, the beam light passes through a scanning lens and is guided to a photoconductor drum (image-carrying member). The beam light scans and exposes a surface of the photoconductor drum to thus form an electrostatic latent image on the surface of the photoconductor drum.

Further, due to a restriction on layout of the image forming apparatus, the beam light that has passed through the scanning lens may be unable to be directly guided to the photoconductor drum. In this case, a mirror reflects the beam light to guide the beam light to the photoconductor drum. The mirror is normally pressed against a seating surface formed in a housing of the laser scanning unit by a pressure retaining member such as a leaf spring. Thus, the mirror is positioned and fixed.

SUMMARY

A first pressure retaining member according to the present disclosure presses an optical element that guides beam light to be scanned to an image-carrying member against a retaining portion of a housing to retain the optical element in the retaining portion. The pressure retaining member is formed by bending a metal plate. The pressure retaining member includes a body portion and two pressing portions. The body portion is supported by the housing. The two pressing portions are connected to the body portion, can be elastically deformed, and press the optical element toward the retaining portion. One of the two pressing portions is formed with a restriction portion which restricts a depth with which the other one of the two pressing portions enters between the two pressing portions of another pressure retaining member or a depth with which the body portion of the another pressure retaining member enters between the two pressing portions.

A second pressure retaining member according to the present disclosure presses an optical element that guides beam light to be scanned to an image-carrying member against a retaining portion of a housing to retain the optical element in the retaining portion. The pressure retaining member is formed by bending a metal plate. The pressure retaining member includes a body portion and a pressing portion. The body portion is supported by the housing. The pressing portion is connected to the body portion, can be elastically deformed, and presses the optical element toward the retaining portion. The pressing portion is formed with a restriction portion which restricts a depth with which the body portion enters between the body portion and the pressing portion of another pressure retaining member.

A laser scanning unit according to the present disclosure includes the optical element, a housing including the retaining portion which retains the optical element, and the first pressure retaining member or the second pressure retaining member. The laser scanning unit exposes a surface of the image-carrying member to form an electrostatic latent image.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Hereinafter, embodiments of the present disclosure will be described with reference to the drawings.

Figure 1:
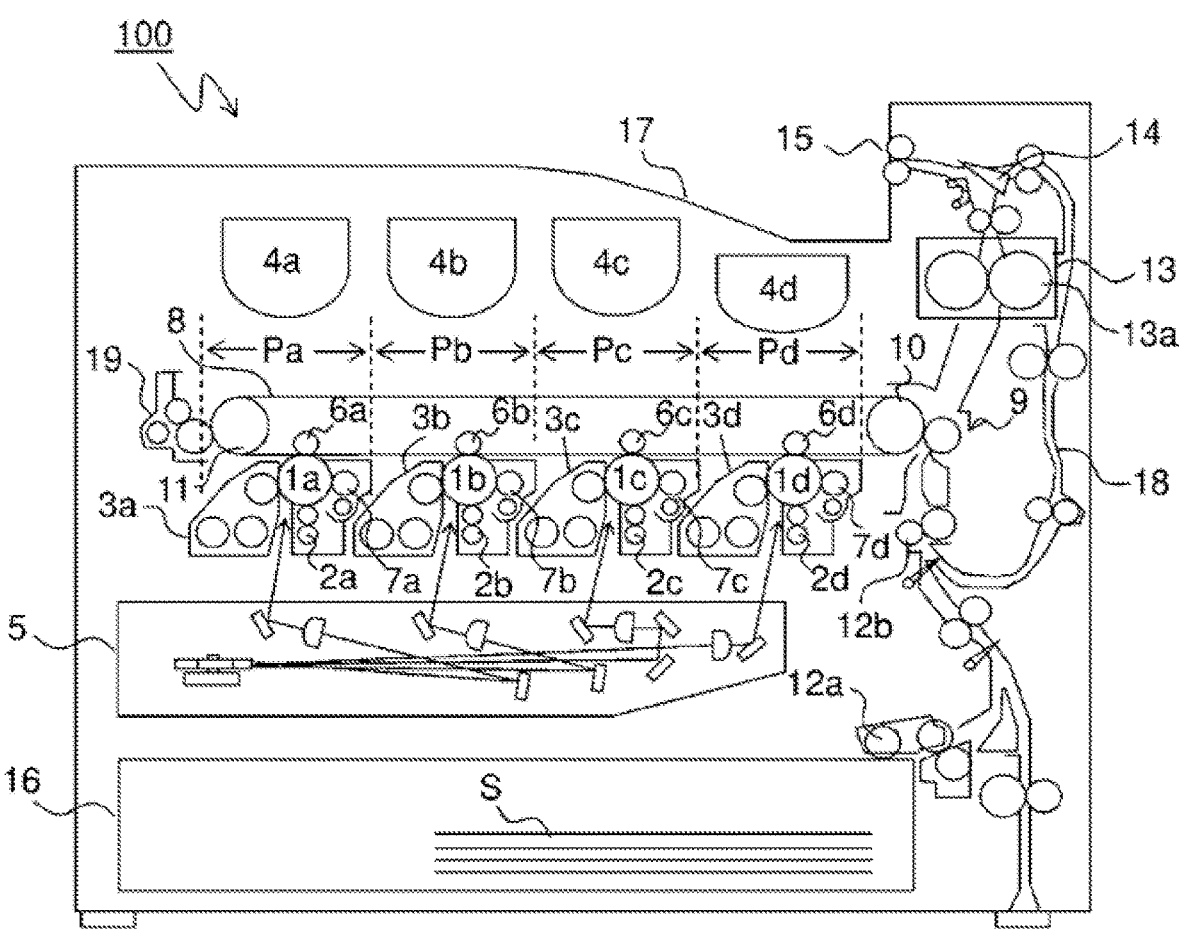
FIG. 1 is a diagram showing an overall configuration of an image forming apparatus on which a laser scanning unit according to an embodiment of the present disclosure is mounted.

An image forming apparatus 100 shown in FIG. 1 is a so-called tandem-type color printer. Four image forming portions Pa, Pb, Pc, and Pd are arranged in order from an upstream side toward a downstream side of an image conveying direction inside a body of the image forming apparatus 100. The upstream side of the image conveying direction is a left side when looking at FIG. 1.

The image forming portions Pa to Pd are provided in correspondence with images of four colors of magenta, cyan, yellow, and black. The image forming portions Pa to Pd respectively execute charging processing, exposure processing, development processing, and primary transfer processing to sequentially form magenta, cyan, yellow, and black images.

The image forming portions Pa to Pd respectively include photoconductor drums 1a, 1b, 1c, and 1d that respectively carry the toner images in the four colors. The toner images are visible images.

Further, an intermediate transfer belt 8 is provided adjacent to the image forming portions Pa to Pd. A drive roller 10 and a tension roller 11 support the intermediate transfer belt 8. The intermediate transfer belt 8 rotates counterclockwise when looking at FIG. 1 while being in contact with the photoconductor drums 1a to 1d. The intermediate transfer belt 8 is, for example, a seamless belt.

The toner images in the four colors formed on the photoconductor drums 1a to 1d are sequentially transferred onto the intermediate transfer belt 8 and are thereafter transferred onto a paper sheet S by a secondary transfer unit 9. The paper sheet S is an example of a recording medium.

Further, after the toner images are fixed onto the paper sheet S by a fixing portion 13, the paper sheet S is discharged from the body of the image forming apparatus 100.

The paper sheet S is stored in a paper sheet cassette 16 provided at a lower portion of the body of the image forming apparatus 100. The paper sheet S is conveyed to the secondary transfer unit 9 via a sheet feed roller 12a and a registration roller pair 12b. The secondary transfer unit 9 is provided adjacent to the intermediate transfer belt 8.

Image forming processes with respect to the photoconductor drums 1a to 1d are executed while the photoconductor drums 1a to 1d are rotating in a drum rotating direction. The drum rotating direction is a clockwise direction when looking at each of FIG. 1 and FIG. 2.

Next, the image forming portions Pa to Pd will be described. Hereinafter, the image forming portion Pa will be described in detail. It is noted that since the image forming portions Pb to Pd have configurations similar to that of the image forming portion Pa, descriptions on the image forming portions Pb to Pd will be omitted.

Figure 2:
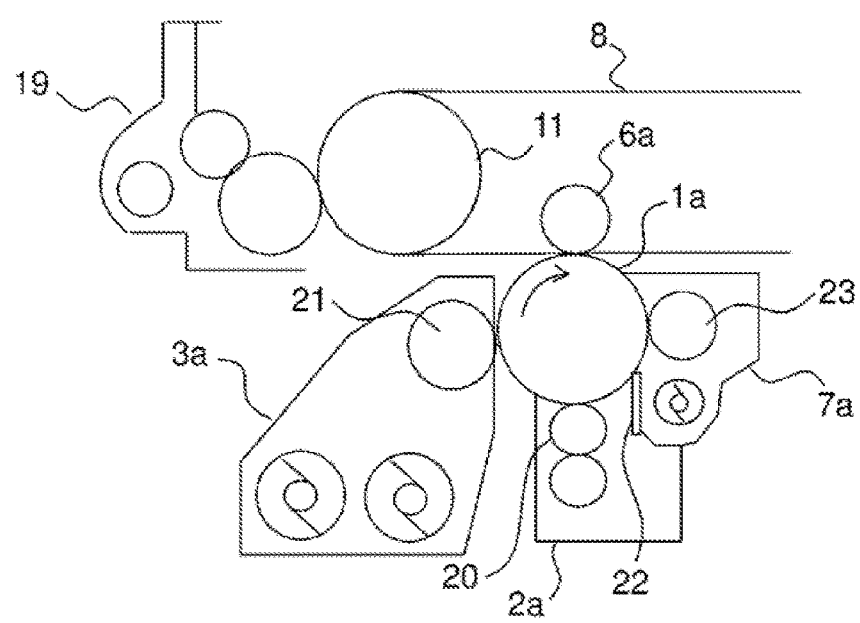
FIG. 2 is an enlarged view showing a vicinity of an image forming portion in FIG. 1.

As shown in FIG. 2, a charging device 2a, a developing device 3a, a cleaning device 7a, and a primary transfer roller 6a are arranged in a periphery of the photoconductor drum 1a along the drum rotating direction. The primary transfer roller 6a is arranged while sandwiching the intermediate transfer belt 8 with the photoconductor drum 1a.

A belt cleaning unit 19 is arranged on an upstream side of a rotating direction of the intermediate transfer belt 8 with respect to the photoconductor drum 1a. The belt cleaning unit 19 is arranged while sandwiching the intermediate transfer belt 8 with the tension roller 11.

Next, image forming procedures in the image forming apparatus 100 will be described. When an image forming start request is input by a user, rotations of the photoconductor drums 1a to 1d are started first by a main motor (not shown), and the charging devices 2a to 2d uniformly charge the surfaces of the photoconductor drums 1a to 1d by charging rollers 20.

Further, a laser scanning unit 5 radiates beam light (laser light) onto the surfaces of the photoconductor drums 1a to 1d to thus form electrostatic latent images corresponding to image signals on the respective photoconductor drums 1a to 1d.

The developing devices 3a to 3d are filled with a predetermined amount of toner of the respective colors of magenta, cyan, yellow, and black. It is noted that when a ratio of toner of two-component developer in the developing devices 3a to 3d falls below a specified value, toner is supplied from toner containers 4a to 4d to the developing devices 3a to 3d, respectively.

The developing devices 3a to 3d supply the toner in the developer onto the respective photoconductor drums 1a to 1d using developing rollers 21. Thus, the toner electrically adheres onto a part of the surface of each of the photoconductor drums 1a to 1d, and toner images corresponding to the electrostatic latent images are formed.

The primary transfer rollers 6a to 6d impart an electric field between the primary transfer rollers 6a to 6d and the photoconductor drums 1a to 1d at a predetermined transfer voltage. Thus, the magenta, cyan, yellow, and black toner images that have been respectively formed on the photoconductor drums 1a to 1d are primarily transferred onto the intermediate transfer belt 8.

The toner images in the four colors are formed with a predetermined positional relationship that has been preset for predetermined full-color image formation. In preparation for subsequent formation of new electrostatic latent images, the cleaning devices 7a to 7d remove toner that has remained on the surfaces of the photoconductor drums 1a to 1d using cleaning blades 22 and rubbing rollers 23.

A belt drive motor (not shown) causes the drive roller 10 to rotate, and the intermediate transfer belt 8 rotates in accordance with the rotation of the drive roller 10. The paper sheet S is conveyed from the registration roller pair 12b to the secondary transfer unit 9 at a predetermined timing.

The toner images are transferred onto the paper sheet S by the secondary transfer unit 9. The paper sheet S onto which the toner images have been transferred is conveyed to the fixing portion 13. The toner that has remained on the surface of the intermediate transfer belt 8 is removed by the belt cleaning unit 19.

By heating and pressurizing the paper sheet S conveyed to the fixing portion 13 by a fixing roller pair 13a, the toner images are fixed onto the surface of the paper sheet S so that a predetermined full-color image is formed on the paper sheet S.

The conveying direction of the paper sheet S formed with the full-color image is sorted by a branching portion 14 branched into a plurality of directions. The paper sheet S is discharged onto a discharge tray 17 by a discharge roller pair 15, directly from the branching portion 14 or after being conveyed to a duplex conveying path 18 and subjected to duplex printing.

Figure 3:
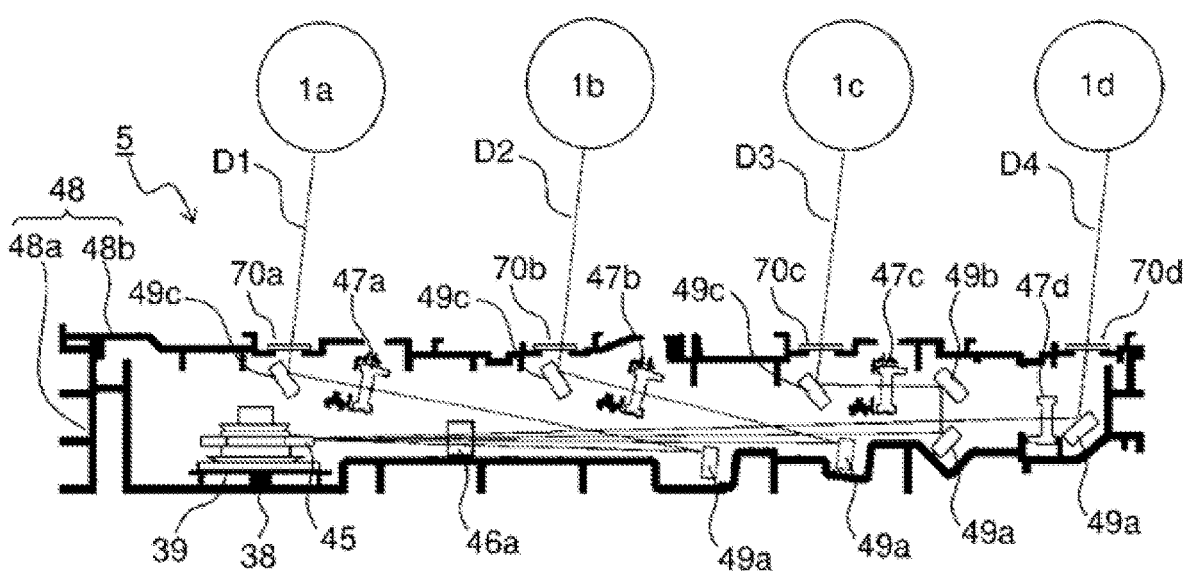
FIG. 3 is a vertical cross-sectional view showing an internal structure of the laser scanning unit according to the embodiment of the present disclosure.

Next, the laser scanning unit 5 will be described. As shown in FIG. 3, the laser scanning unit 5 includes a housing 48. The housing 48 includes a body portion 48*a* and a lid portion 48*b*.

A polygon mirror 45 is arranged on a bottom surface of the body portion 48*a*. In the present embodiment, the polygon mirror 45 includes a rotary polygon mirror of a regular polygon, which has a plurality of deflected surfaces (reflection surfaces) on side surfaces thereof.

The polygon mirror 45 is driven by a polygon motor 38 and rotates at a predetermined speed. The polygon motor 38 is fixed to a motor supporting plate 39, and the motor supporting plate 39 is fixed to the bottom surface of the body portion 48*a*.

A laser light source, a collimator lens, an aperture, and a cylindrical lens (all of which are not shown) are arranged inside the housing 48. A first scanning lens 46*a*, second scanning lenses 47*a* to 47*d*, and plane mirrors 49*a* to 49*c* are also arranged inside the housing 48.

The first scanning lens 46*a* and the second scanning lenses 47*a* to 47*d* have fθ characteristics, and laser light D1 to D4 reflected by the polygon mirror 45 are respectively imaged on the photoconductor drums 1*a* to 1*d*. The plane mirrors 49*a* to 49*c* are arranged on optical paths of the laser light D1 to D4 from the polygon mirror 45 to the photoconductor drums 1*a* to 1*d*.

Next, scanning operations of the laser light D1 and D2 by the laser scanning unit 5 will be described. The laser light D1 and D2 emitted from the laser light sources become a substantially-parallel light flux by the collimator lens, and a width of the light flux is adjusted to a predetermined width by the aperture.

The light flux of the laser light D1 and D2 enters the cylindrical lens. Regarding the light flux emitted from the cylindrical lens, a parallel state of the laser light D1 and D2 is maintained in a cross section in a main scanning direction, and the laser light D1 and D2 converge in a sub-scanning direction. Thus, the light flux of the laser light D1 and D2 converges as linear light on the deflected surface of the polygon mirror 45.

The laser scanning unit 5 is configured such that the two laser light D1 and D2 enter at different angles in the sub-scanning direction with respect to the deflected surface. Thus, the optical paths of the two laser light D1 and D2 deflected by the polygon mirror 45 are separated.

After being deflected by the polygon mirror 45 so as to be scanned at a uniform angular velocity, the laser light D1 and D2 are deflected so as to be scanned at a uniform speed by the first scanning lens 46*a*.

The laser light D1 and D2 that have passed through the first scanning lens 46*a* are reflected by the plane mirrors 49*a* arranged on the respective optical paths. Thus, the laser light D1 enters the second scanning lens 47*a*, and the laser light D2 enters the second scanning lens 47*b*. The laser light D1 and D2 are deflected so as to be scanned at a uniform speed by the second scanning lenses 47*a* and 47*b*.

After passing through the second scanning lenses 47*a* and 47*b*, the laser light D1 and D2 are reflected by the plane mirrors 49*c* arranged on the respective optical paths and respectively pass through window portions 70*a* and 70*b* to be radiated onto the photoconductor drums 1*a* and 1*b*. The window portions 70*a* and 70*b* are formed in the lid portion 48*b* that covers an opening portion of the body portion 48*a*.

Similar to the laser light D1 and D2, the laser light D3 and D4 emitted from the laser light sources also pass through the collimator lens, the aperture, and the cylindrical lens and are thereafter deflected by the polygon mirror 45 and the first scanning lens 46*a*.

The laser light D3 that has passed through the first scanning lens 46*a* is reflected twice by the plane mirrors 49*a* and 49*b* and then enters the second scanning lens 47*c*. The laser light D4 that has passed through the first scanning lens 46*a* enters the second scanning lens 47*d*. The laser light D3 and D4 are respectively deflected so as to be scanned at a uniform speed by the second scanning lenses 47*c* and 47*d*.

In addition, after being reflected by the plane mirrors 49*c* and 49*a*, the laser light D3 and D4 respectively pass through window portions 70*c* and 70*d* to be radiated onto the photoconductor drums 1*c* and 1*d*. The window portions 70*c* and 70*d* are formed in the lid portion 48*b*.

The first scanning lens 46*a*, the second scanning lenses 47*a* to 47*d*, and the plane mirrors 49*a* to 49*c* are each an example of an optical element that guides the laser light D1 to D4 to be scanned to the photoconductor drums 1*a* to 1*d*. The polygon mirror 45, the first scanning lens 46*a*, the second scanning lenses 47*a* to 47*d*, and the plane mirrors 49*a* to 49*c* constitute a scanning optical system which scans the laser light D1 to D4.

Figure 6:
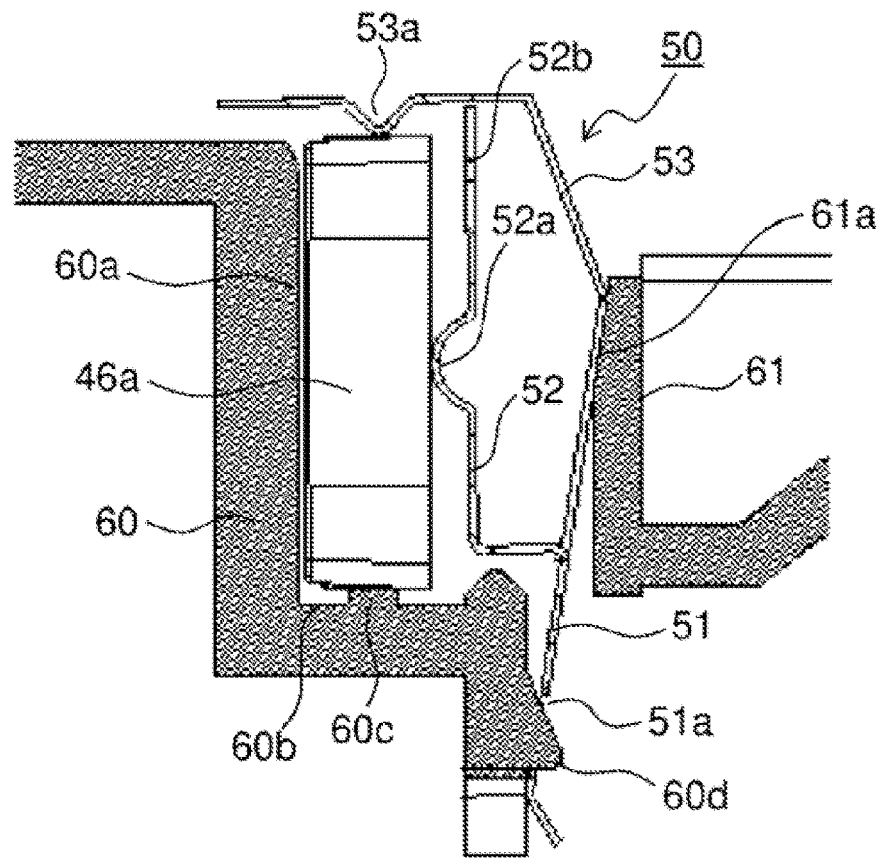
FIG. 6 is a vertical cross-sectional view showing a portion in the vicinity of the lens retaining portion of the housing in the state where the pressing spring according to the first embodiment presses and retains the first scanning lens.

A pressing spring 50 according to a first embodiment retains the first scanning lens 46*a* in a lens retaining portion 60 of the housing 48 (see FIG. 6). The pressing spring 50 is an example of a pressure retaining member which presses the optical element against the retaining portion of the housing 48 to thus retain the optical element in the retaining portion.

Figure 4:
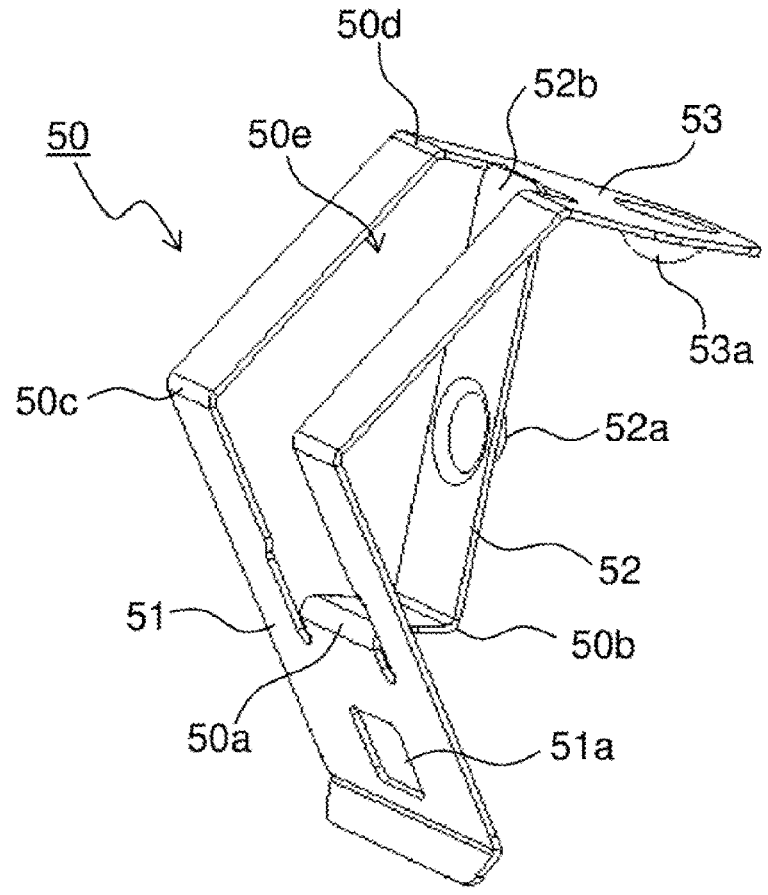
FIG. 4 is a perspective view showing a pressing spring according to a first embodiment of the present disclosure.

The pressing spring 50 is formed by bending a metal plate (see FIG. 4). The pressing spring 50 includes a spring body portion 51, a first pressing portion 52, and a second pressing portion 53 (see FIG. 4 to FIG. 6).

Figure 5:
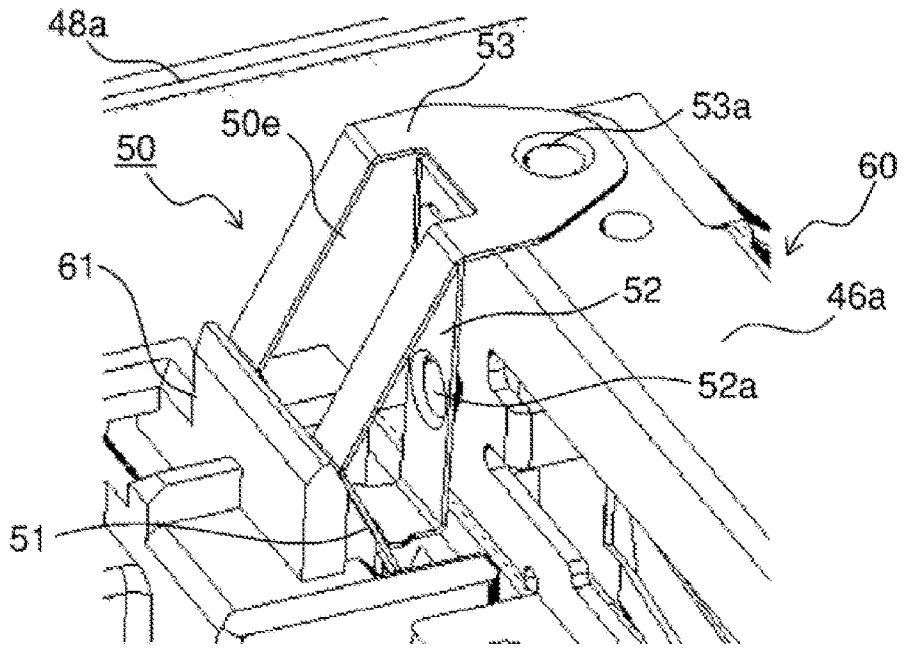
FIG. 5 is a partial perspective view showing a vicinity of a lens retaining portion inside a housing in a state where the pressing spring according to the first embodiment presses and retains a first scanning lens.

The spring body portion 51 is supported by a spring supporting portion 61 of the housing 48 (see FIG. 5 and FIG. 6). An engagement hole 51*a* is formed at a lower end portion of the spring body portion 51. The engagement hole 51*a* engages with an engagement portion 60*d* of the lens retaining portion 60 (see FIG. 6). The lens retaining portion 60 is an example of the retaining portion of the housing 48.

The pressing spring 50 includes a first bending portion 50*a*, a second bending portion 50*b*, and a third bending portion 50*c* (see FIG. 4). The first bending portion 50*a* is a portion bent in one direction from the spring body portion 51. The second bending portion 50*b* is a portion bent in an opposite direction from the first bending portion 50*a* at a portion extending from the first bending portion 50*a*. The third bending portion 50*c* is a portion bent from the spring body portion 51 in the same direction as the first bending portion 50*a*.

The first pressing portion 52 is a portion extending from the first bending portion 50*a* above the engagement hole 51*a* and includes the second bending portion 50*b*. The first pressing portion 52 is formed in an L shape in a side view.

The first pressing portion 52 is connected to the spring body portion 51 by the first bending portion 50*a* and can be elastically deformed using the first bending portion 50*a* as a fulcrum. At substantially a center portion of the first pressing portion 52 in a longitudinal direction, a hemispherical first pressing contact point 52*a* is formed. The first pressing portion 52 includes an extending portion 52*b* extending upwardly from the portion formed with the first pressing contact point 52*a*.

The second pressing portion 53 is a portion that is formed at an upper end portion of the spring body portion 51 and extends from the third bending portion 50*c*. In the present embodiment, the second pressing portion 53 includes a fourth bending portion 50*d*. In a side view, the second pressing portion 53 is bent in an inverted V shape at the fourth bending portion 50*d*.

The second pressing portion 53 is connected to the spring body portion 51 by the third bending portion 50*c* and can be elastically deformed using the third bending portion 50*c* as a fulcrum. A hemispherical second pressing contact point 53*a* is formed at a tip end portion of the second pressing portion 53.

The pressing spring 50 is formed with a first slit 50*e*. The first slit 50*e* is formed at a portion ranging from the first bending portion 50*a* to the third bending portion 50*c* in the spring body portion 51 and a portion extending from the third bending portion 50*c* in the second pressing portion 53.

The extending portion 52*b* extends toward an end portion of the first slit 50*e* on the second pressing portion 53 side. A tip end portion of the extending portion 52*b* is inserted into the end portion of the first slit 50*e* on the second pressing portion 53 side.

In the present embodiment, the extending portion 52*b* penetrates through the first slit 50*e*, and the tip end portion of the extending portion 52*b* is formed to be higher than an upper surface of the second pressing portion 53.

FIG. 5 and FIG. 6 each show a state where the first scanning lens 46*a* is pressed by the pressing spring 50 to be retained. It is noted that although FIG. 5 and FIG. 6 each show a retaining structure on one end side of the first scanning lens 46*a* in the longitudinal direction, the retaining structure on the other end side of the first scanning lens 46*a* in the longitudinal direction has a similar configuration.

The body portion 48*a* of the housing 48 is provided with the lens retaining portion 60. For example, the lens retaining portion 60 is formed substantially in an L shape in a side view. The lens retaining portion 60 includes a first retaining surface 60*a* and a second retaining surface 60*b*.

The first retaining surface 60*a* opposes a light incidence surface of the first scanning lens 46*a*. The light incidence surface is a first side surface of the first scanning lens 46*a* and is a surface on the left side when looking at FIG. 6.

The second retaining surface 60*b* opposes a lower surface of the first scanning lens 46*a*. The second retaining surface 60*b* is formed with a protrusion 60*c*.

The body portion 48*a* includes the spring supporting portion 61 and the engagement portion 60*d* formed below the second retaining surface 60*b*. The spring supporting portion 61 opposes the first retaining surface 60*a* of the lens retaining portion 60 with a predetermined interval provided therebetween. A tilted surface 61*a* is formed at an upper portion of the spring supporting portion 61.

The pressing spring 50 is inserted between a light-emitting surface of the first scanning lens 46*a* and the spring supporting portion 61. The light-emitting surface is a second surface of the first scanning lens 46*a* and is a surface on the right side when looking at FIG. 6.

By engaging the engagement hole 51*a* of the spring body portion 51 with the engagement portion 60*d*, the pressing spring 50 is positioned with respect to the housing 48. The first pressing portion 52 is in contact with the light-emitting surface of the first scanning lens 46*a* at the first pressing contact point 52*a*. The second pressing portion 53 is in contact with an upper surface of the first scanning lens 46*a* at the second pressing contact point 53*a*.

In other words, the first pressing portion 52 of the pressing spring 50 presses the first scanning lens 46*a* against the first retaining surface 60*a* of the lens retaining portion 60. Further, the second pressing portion 53 of the pressing spring 50 presses the first scanning lens 46*a* against the protrusion 60*c* on the second retaining surface 60*b* of the lens retaining portion 60. The protrusion 60*c* supports a lower surface of the first scanning lens 46*a*.

In the present embodiment, a single pressing spring 50 can stably retain the first scanning lens 46*a* on the first retaining surface 60*a* and second retaining surface 60*b* of the lens retaining portion 60. Therefore, a plurality of pressing springs 50 do not need to be prepared with respect to a single first scanning lens 46*a*.

Figure 7:
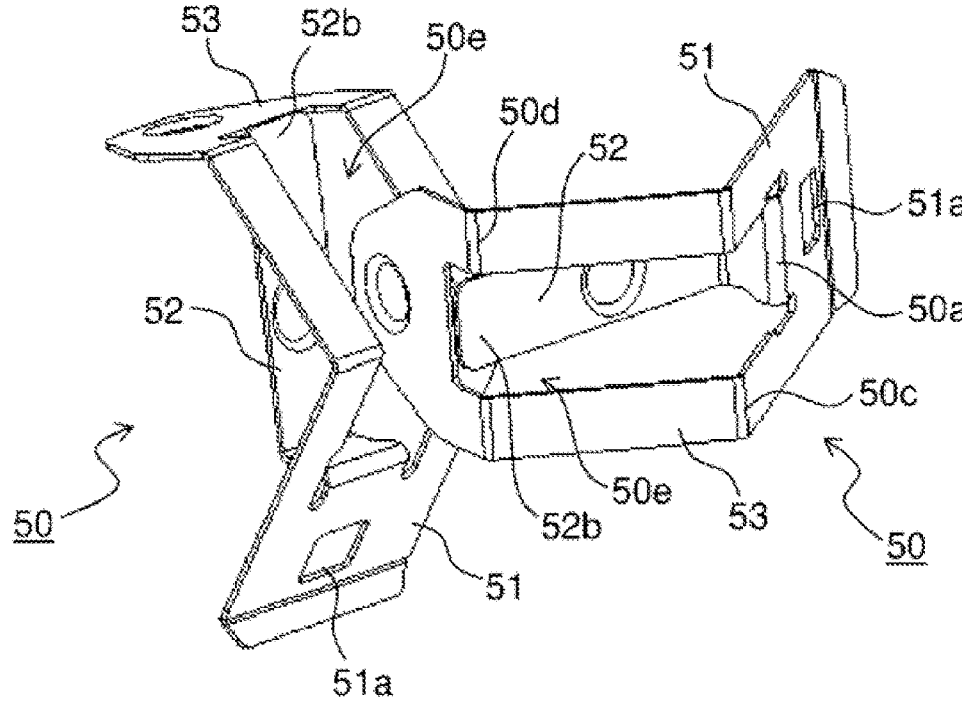
FIG. 7 is a perspective view showing a state where a second pressing portion of one of two pressing springs enters between a first pressing portion and second pressing portion of the other one of the two pressing springs along a first direction in the first embodiment.
Figure 8:
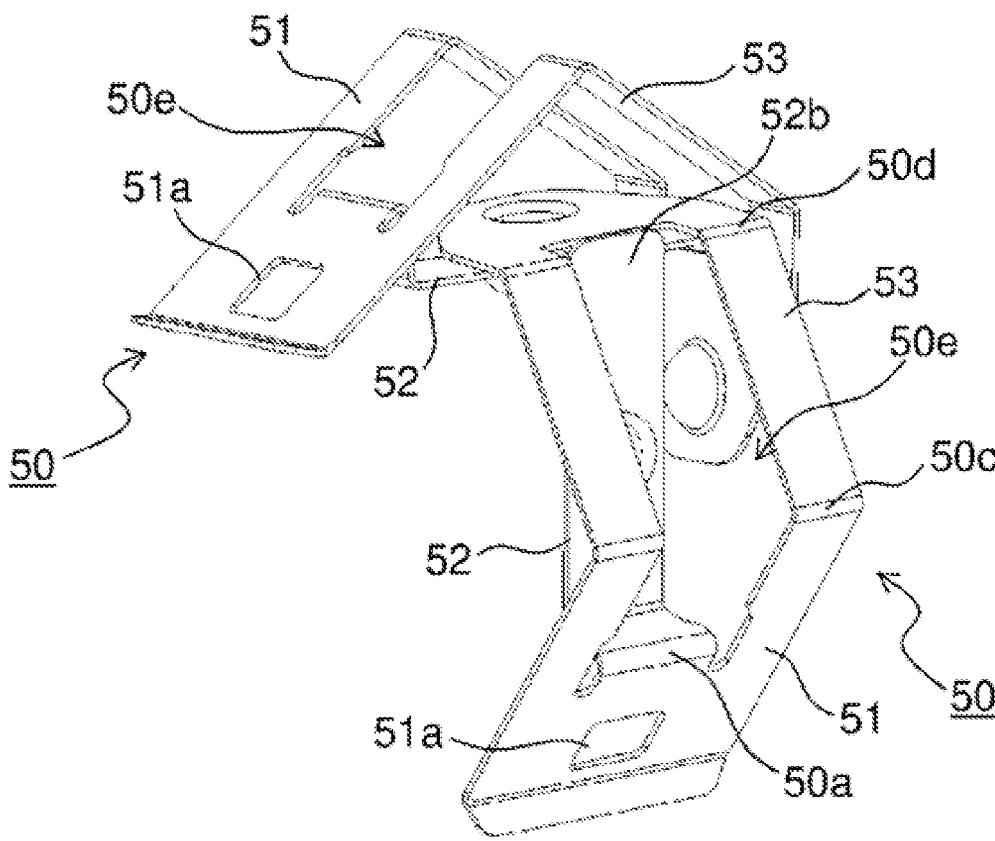
FIG. 8 is a perspective view showing a state where the second pressing portion of one of the two pressing springs enters between the first pressing portion and the second pressing portion of the other one of the two pressing springs along a second direction.

When the plurality of pressing springs 50 are housed in the housing 48, the second pressing portion 53 of one of the two pressing springs 50 may enter between the first pressing portion 52 and the second pressing portion 53 of the other one of the two pressing springs 50 (see FIG. 7 and FIG. 8).

In the example shown in FIG. 7, a tip end portion of the second pressing portion 53 of the pressing spring 50 shown on the right side is entering between the first pressing portion 52 and the second pressing portion 53 of the pressing spring 50 shown on the left side along a first direction. The first direction is an entering direction from the first slit 50*e* toward to a gap between the first pressing portion 52 and the second pressing portion 53.

In the present embodiment, the tip end portion of the extending portion 52*b* is inserted into the end portion of the first slit 50*e* on the second pressing portion 53 side. Therefore, when the second pressing portion 53 of one of the two pressing springs 50 enters between the first pressing portion 52 and the second pressing portion 53 of the other one of the two pressing springs 50 along the first direction as shown in FIG. 7, the extending portion 52*b* restricts an entering depth of the second pressing portion 53. Thus, the two pressing springs 50 do not get entangled with each other.

In the example shown in FIG. 8, the tip end portion of the second pressing portion 53 of the pressing spring 50 shown on the front side is entering between the first pressing portion 52 and the second pressing portion 53 of the pressing spring 50 shown on the rear side along a second direction. The second direction is a direction intersecting with the first direction.

In the present embodiment, the tip end portion of the extending portion 52*b* is inserted into the end portion of the first slit 50*e* on the second pressing portion 53 side. Therefore, when the second pressing portion 53 of one of the two pressing springs 50 enters between the first pressing portion 52 and the second pressing portion 53 of the other one of the two pressing springs 50 along the second direction as shown in FIG. 8, the extending portion 52*b* restricts the entering depth of the second pressing portion 53. Thus, the two pressing springs 50 do not get entangled with each other.

In the present embodiment, the extending portion 52*b* is an example of a restriction portion which restricts a depth with which the second pressing portion 53 of a certain pressing spring 50 enters between the two pressing portions 52 and 53 of another pressing spring 50.

In other words, by adopting the first embodiment, it is possible to prevent, when transporting the plurality of pressing springs 50 or when housing the plurality of pressing springs 50 in the housing 48 for assembling the laser scanning unit 5, an inconvenience that the plurality of pressing springs 50 get entangled with each other from occurring. As a result, supply of the plurality of pressing springs 50 before assembling becomes possible by a parts feeder having a simple configuration.

Further, since a task of detangling the plurality of tangled pressing springs 50 becomes unnecessary, workability in assembling the laser scanning unit 5 is improved. In addition, a special transportation case or the like for preventing the plurality of pressing springs 50 from getting entangled is unnecessary. This leads to an improvement in efficiency and reduction in costs in transporting the plurality of pressing springs 50.

In the present embodiment, the extending portion 52*b* of the first pressing portion 52 penetrates through the first slit 50*e*, and the tip end portion of the extending portion 52*b* protrudes to be slightly higher than the upper surface of the second pressing portion 53. However, the tip end portion of the extending portion 52*b* may be formed to be flush with the upper surface of the second pressing portion 53.

Moreover, an interval smaller than a thickness of the metal plate forming the pressing spring 50 may be provided between the tip end portion of the extending portion 52*b* and the end portion of the first slit 50*e* on the second pressing portion 53 side. As long as the interval between the tip end portion of the extending portion 52*b* and the end portion of the first slit 50*e* is not widened by an external force, the entering depth of the spring body portion 51, the first pressing portion 52, or the second pressing portion 53 of another pressing spring 50 is restricted. In other words, if the interval between the extending portion 52*b* and the end portion of the first slit 50*e* is smaller than the thickness of the metal plate, entangling of the pressing springs 50 is suppressed.

Figure 9:
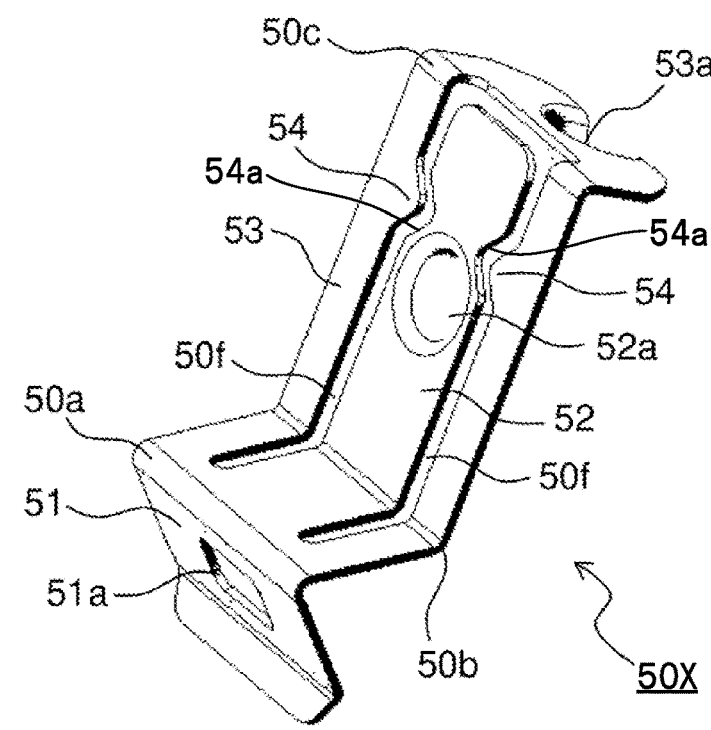
FIG. 9 is a perspective view showing a pressing spring according to a second embodiment of the present disclosure.

FIG. 9 is a perspective view of a pressing spring 50X according to a second embodiment of the present disclosure. The pressing spring 50X is formed by bending a metal plate. The pressing spring 50X includes the spring body portion 51, the first pressing portion 52, and the second pressing portion 53 (see FIG. 9).

Figure 10:
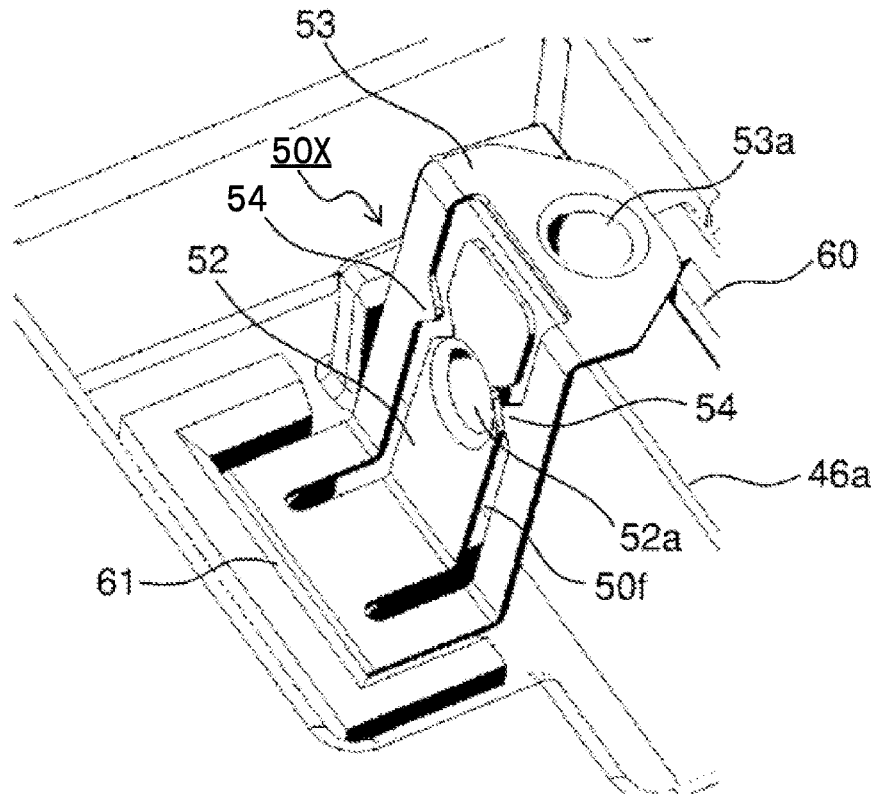
FIG. 10 is a partial perspective view showing the vicinity of the lens retaining portion of the housing in a state where the pressing spring according to the second embodiment presses and retains the first scanning lens.
Figure 11:
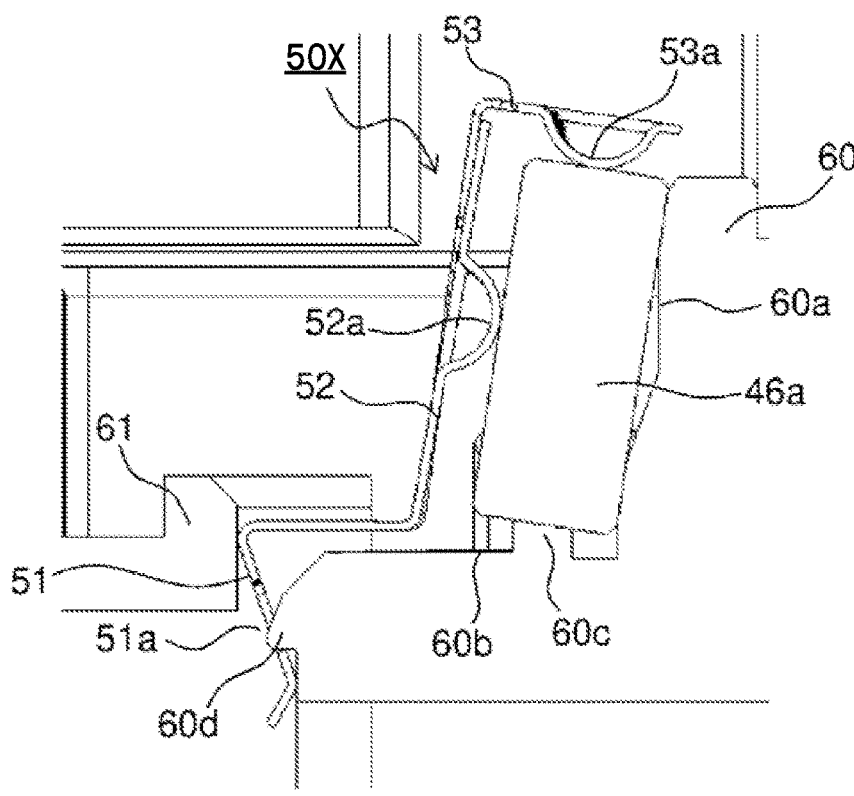
FIG. 11 is a vertical cross-sectional view showing the portion in the vicinity of the lens retaining portion of the housing in the state where the pressing spring according to the second embodiment presses and retains the first scanning lens.

The spring body portion 51 is supported by the spring supporting portion 61 of the housing 48 (see FIG. 10 and FIG. 11). The engagement hole 51*a* is formed at substantially the center portion of the spring body portion 51. The engagement hole 51*a* engages with the engagement portion 60*d* of the lens retaining portion 60 (see FIG. 11).

The pressing spring 50X includes the first bending portion 50*a*, the second bending portion 50*b*, and the third bending portion 50*c* (see FIG. 9). The first bending portion 50*a* is a portion bent in one direction from an upper end portion of the spring body portion 51. The second bending portion 50*b* is a portion bent in an opposite direction from the first bending portion 50*a* at a portion extending from the first bending portion 50*a*. The third bending portion 50*c* is a portion bent in the same direction as the first bending portion 50*a* at a portion extending from the second bending portion 50*b*.

The first pressing portion 52 is connected to the spring body portion 51 by a part of the first bending portion 50*a*. The first pressing portion 52 is a portion extending from the part of the first bending portion 50*a* and includes a part of the second bending portion 50*b*. The first pressing portion 52 is formed in an L shape in a side view.

The first pressing portion 52 can be elastically deformed using the first bending portion 50*a* as a fulcrum. At a portion nearer to the tip end than the center of the first pressing portion 52 in the longitudinal direction, the hemispherical first pressing contact point 52*a* is formed.

The second pressing portion 53 is connected to the spring body portion 51 by another part of first bending portion 50*a*. The second pressing portion 53 is a portion extending from the another part of the first bending portion 50*a*. The second pressing portion 53 includes another part of the second bending portion 50*b*, a portion extending from the second bending portion 50*b*, the third bending portion 50*c*, and a portion extending from the third bending portion 50*c*. The second pressing portion 53 is formed to enclose the first pressing portion 52 and is formed in a Z shape in a side view.

The second pressing portion 53 can be elastically deformed using the first bending portion 50*a* as a fulcrum. A portion of the second pressing portion 53 ranging from the first bending portion 50*a* to the third bending portion 50*c* is on substantially the same plane as the first pressing portion 52. A tip end portion of the second pressing portion 53 extending from the third bending portion 50*c* is formed with the hemispherical second pressing contact point 53*a*.

A second slit 50*f* is formed between an outer edge portion of the first pressing portion 52 and an inner edge portion of the second pressing portion 53 so as to enclose the first pressing portion 52. The first pressing portion 52 and the second pressing portion 53 can independently be elastically deformed each using the first bending portion 50*a* as a fulcrum.

The inner edge portion of the second pressing portion 53 with respect to the first pressing portion 52 includes protrusion portions 54 that protrude triangularly in the second slit 50*f* toward a side edge portion of the first pressing portion 52. Further, the side edge portion of the first pressing portion 52 includes concave portions 54*a* formed along an outer edge of the protrusion portions 54. Thus, a part of the second slit 50*f* is curved by the protrusion portions 54 and the concave portions 54*a*.

FIG. 10 and FIG. 11 each show a state where the first scanning lens 46*a* is pressed by the pressing spring 50X to be retained. It is noted that although FIG. 10 and FIG. 11 each show a retaining structure on one end side of the first scanning lens 46*a* in the longitudinal direction, the retaining structure on the other end side of the first scanning lens 46*a* in the longitudinal direction has a similar configuration.

The pressing spring 50X is inserted between the light-emitting surface of the first scanning lens 46*a* and the spring supporting portion 61. The light-emitting surface is one side surface of the first scanning lens 46*a* and is a surface on the left side when looking at FIG. 11.

By engaging the engagement hole 51*a* of the spring body portion 51 with the engagement portion 60*d* of the lens retaining portion 60, the pressing spring 50X is positioned with respect to the housing 48. The first pressing portion 52 is in contact with the light-emitting surface of the first scanning lens 46*a* at the first pressing contact point 52*a*. The second pressing portion 53 is in contact with the upper surface of the first scanning lens 46*a* at the second pressing contact point 53*a*.

In other words, the first pressing portion 52 of the pressing spring 50X presses the first scanning lens 46*a* against the first retaining surface 60*a* of the lens retaining portion 60. The light incidence surface of the first scanning lens 46*a* is supported by the first retaining surface 60*a*. The light incidence surface is one side surface of the first scanning lens 46*a* and is a surface on the right side when looking at FIG. 11. Further, the second pressing portion 53 of the pressing spring 50X presses the first scanning lens 46*a* against the protrusion 60*c* on the second retaining surface 60*b* of the lens retaining portion 60. The protrusion 60*c* supports the lower surface of the first scanning lens 46*a*.

In the present embodiment, similar to the first embodiment, a single pressing spring 50X can stably retain the first scanning lens 46*a* on the first retaining surface 60*a* and second retaining surface 60*b* of the lens retaining portion 60. Therefore, a plurality of pressing springs 50X do not need to be prepared with respect to a single first scanning lens 46*a*.

11

Figure 12:
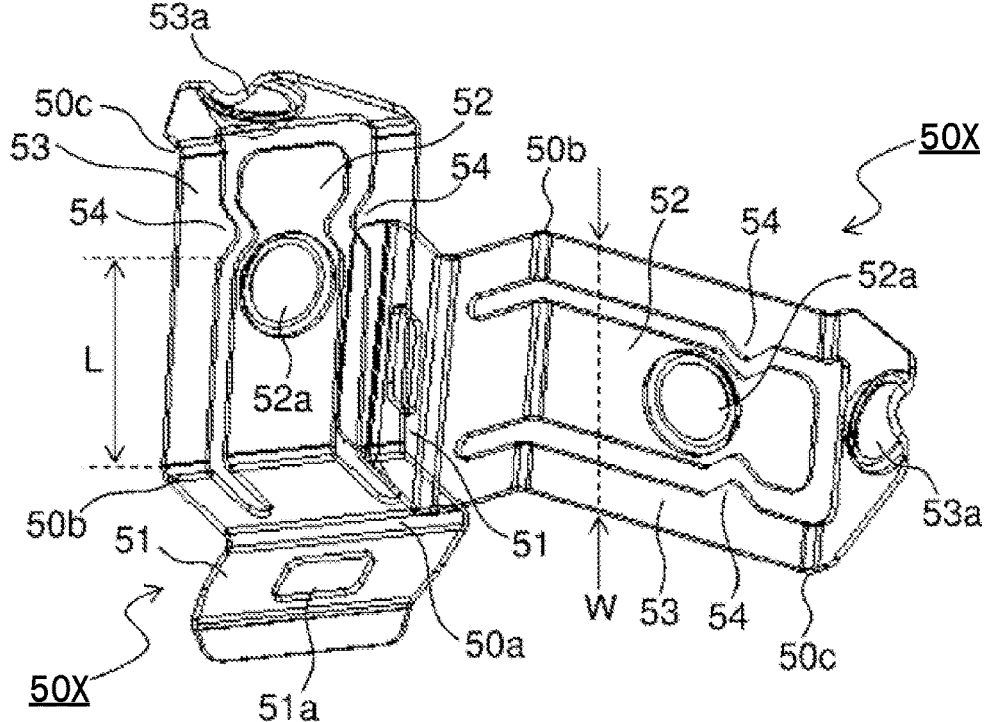
FIG. 12 is a perspective view showing a state where the second pressing portion of one of two pressing springs enters a first slit of the other one of the two pressing springs in the second embodiment.

When the plurality of pressing springs 50X are housed in the housing 48, the spring body portion 51 of one of the two pressing springs 50X may enter between the first pressing portion 52 and the second pressing portion 53 of the other one of the two pressing springs 50X (see FIG. 12).

In the example shown in FIG. 12, the tip end portion of the spring body portion 51 of the pressing spring 50X shown on the right side is entering between the first pressing portion 52 and the second pressing portion 53 of the pressing spring 50X shown on the left side. In the present embodiment, the second slit 50*f* is formed between the first pressing portion 52 and the second pressing portion 53.

In the pressing spring 50X, the inner edge portion of the second pressing portion 53 includes the protrusion portions 54. A length L from the second bending portion 50*b* to the protrusion portions 54 is smaller than a width W of the pressing spring 50X (see FIG. 12).

Therefore, when the tip end portion of the spring body portion 51 of one of the two pressing springs 50X enters between the first pressing portion 52 and the second pressing portion 53 of the other one of the two pressing springs 50X as shown in FIG. 12, the protrusion portions 54 restrict an entering depth of the spring body portion 51. Thus, the two pressing springs 50X do not get entangled with each other.

In the present embodiment, the protrusion portions 54 are an example of the restriction portion that restricts the depth with which the spring body portion 51 of a certain pressing spring 50X enters between the two pressing portions 52 and 53 of another pressing spring 50X.

In other words, by adopting the second embodiment, it is possible to prevent an inconvenience that the plurality of pressing springs 50X get entangled with each other from occurring similar to the case of adopting the first embodiment. This leads to an improvement in efficiency and reduction in costs in transporting the plurality of pressing springs 50X.

In addition, the present disclosure is not limited to the embodiments described above and can be variously modified without departing from the gist of the present disclosure.

Hereinafter, a pressing spring 50Y according to a third embodiment of the present disclosure will be described with reference to FIG. 13. The pressing spring 50Y is a modified example of the pressing spring 50.

Figure 13:
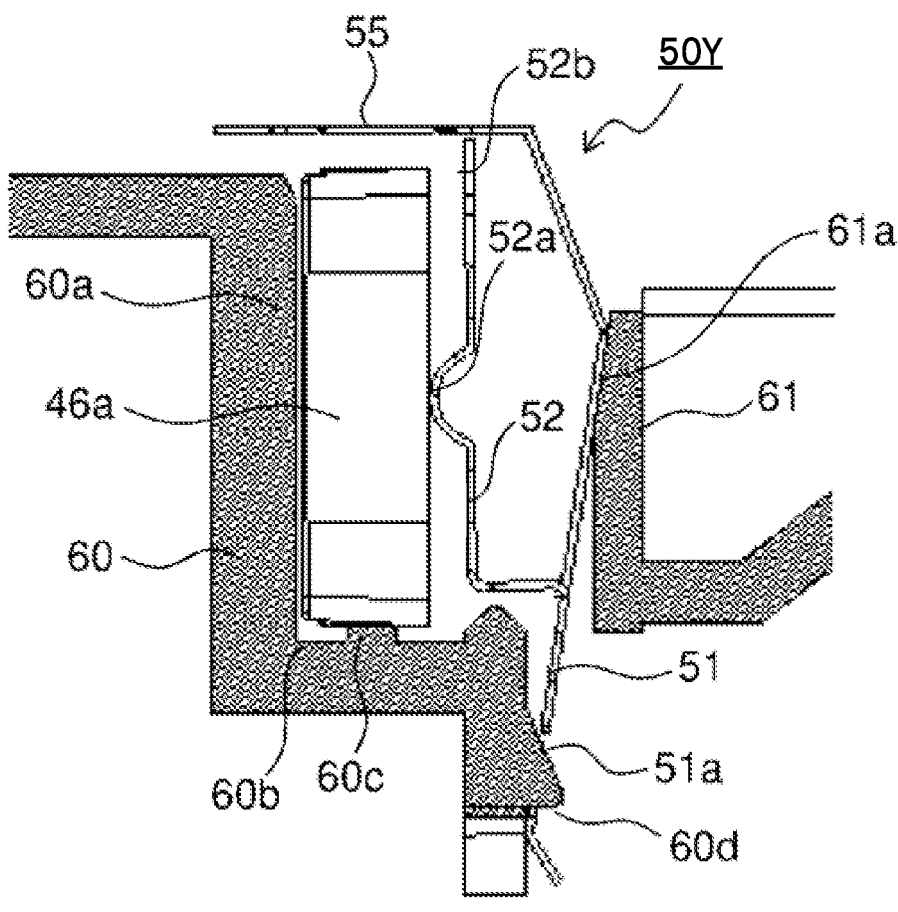
FIG. 13 is a vertical cross-sectional view showing the portion in the vicinity of the lens retaining portion of the housing in a state where a pressing spring according to a third embodiment presses and retains the first scanning lens.

As shown in FIG. 13, the pressing spring 50Y has a configuration in which the second pressing portion 53 of the pressing spring 50 is replaced by an opposing portion 55. The spring body portion 51 includes the opposing portion 55.

The opposing portion 55 of the pressing spring 50Y has a configuration in which the second pressing contact point 53*a* is removed from the second pressing portion 53 of the pressing spring 50. The opposing portion 55 opposes the upper surface of the first scanning lens 46*a*.

As shown in FIG. 13, the opposing portion 55 functions as a retainer portion that does not press the first scanning lens 46*a* and prevents the first scanning lens 46*a* from moving upwardly. The pressing spring 50Y includes only the first pressing portion 52 as a portion that presses the first scanning lens 46*a*.

It is noted that in the pressing spring 50 and the pressing spring 50X, the second pressing portion 53 doubles as the opposing portion 55 that opposes the upper surface of the first scanning lens 46*a*. Further, the second pressing portion 53 may be replaced by the opposing portion 55 by removing the second pressing contact point 53*a* of the second pressing portion 53 in the pressing spring 50X.

Further, in the embodiments described above, the pressing springs 50, 50X, and 50Y press and retain the first scanning lens 46*a*. However, the pressing springs 50, 50X, and 50Y may alternatively press and retain other optical elements such as the second scanning lenses 47*a* to 47*d* or the plane mirrors 49*a* to 49*c*.

Furthermore, in the embodiments described above, a tandem-type color printer has been exemplified as the image forming apparatus 100 on which the laser scanning unit 5 is mounted. However, the present disclosure is not limited to the color printer and is also applicable to a color image forming apparatus that uses electrophotography, such as a color copying machine and a facsimile. Moreover, the present disclosure is also applicable to a monochrome image forming apparatus that uses electrophotography, such as a monochrome printer and a monochrome multifunction peripheral.

The present disclosure can be used as the pressure retaining member that presses and retains an optical member in the laser scanning unit. By using the present disclosure, it is possible to provide the pressure retaining member that is difficult to get entangled when the plurality of pressure retaining members of the same type are present and the laser scanning unit and image forming apparatus including the pressure retaining member.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. A pressure retaining member which presses an optical element that guides beam light to be scanned to an image-carrying member against a retaining portion of a housing to retain the optical element in the retaining portion, wherein the pressure retaining member is formed by bending a metal plate, the pressure retaining member comprises:

a body portion supported by the housing; and two pressing portions which are connected to the body portion, can be elastically deformed, and press the optical element toward the retaining portion, and one of the two pressing portions is formed with a restriction portion which restricts a depth with which the other one of the two pressing portions enters between two pressing portions of another pressure retaining member.

2. The pressure retaining member according to claim 1, comprising:

a first bending portion bent in one direction from the body portion;

a second bending portion bent in an opposite direction from the first bending portion at a portion extending from the first bending portion; and a third bending portion bent in a same direction as the first bending portion from the body portion, wherein the two pressing portions include a first pressing portion which extends from the first bending portion, includes the second bending portion, is formed in an L shape in a side view, and presses a side surface of the optical element, and a second pressing portion which extends from the third bending portion and presses an upper surface of the optical element, a first slit is formed at a portion ranging from the first bending portion to the third bending portion in the body portion and a portion extending from the third bending portion in the second pressing portion, the first pressing portion includes an extending portion extending toward an end portion of the first slit on a side of the second pressing portion, the extending portion is inserted into the end portion of the first slit on the side of the second pressing portion or is provided while having an interval smaller than a thickness of the metal plate provided between the extending portion and the end portion of the first slit on the side of the second pressing portion, and the extending portion is the restriction portion.

3. The pressure retaining member according to claim 2, wherein the extending portion is inserted into the end portion of the first slit on the side of the second pressing portion, and a tip end portion of the extending portion is formed to be flush with an upper surface of the second pressing portion or is formed to protrude to be higher than the upper surface of the second pressing portion.

4. The pressure retaining member according to claim 1, comprising:

a first bending portion bent in one direction from the body portion;

a second bending portion bent in an opposite direction from the first bending portion at a portion extending from the first bending portion; and a third bending portion bent in a same direction as the first bending portion at a portion extending from the second bending portion, wherein the two pressing portions include a first pressing portion which extends from a part of the first bending portion, includes a part of the second bending portion, is formed in an L shape in a side view, and presses a side surface of the optical element, and a second pressing portion which extends from another part of the first bending portion, includes another part of the second bending portion, a portion extending from the second bending portion, the third bending portion, and a portion extending from the third bending portion, is formed to enclose the first pressing portion, is formed in a Z shape in the side view, and presses an upper surface of the optical element, a second slit is formed between an outer edge portion of the first pressing portion and an inner edge portion of the second pressing portion such that the second slit encloses the first pressing portion, the inner edge portion of the second pressing portion includes a protrusion portion protruding into the second slit toward a side edge portion of the first pressing portion, a length from a position of the second bending portion to a position of the protrusion portion in the second slit is smaller than a width of the body portion, and the protrusion portion is the restriction portion.

5. A pressure retaining member which presses an optical element that guides beam light to be scanned to an image-carrying member against a retaining portion of a housing to retain the optical element in the retaining portion, wherein the pressure retaining member is formed by bending a metal plate, the pressure retaining member comprises:

a body portion supported by the housing; and a pressing portion which is connected to the body portion, can be elastically deformed, and presses the optical element toward the retaining portion, and the pressing portion is formed with a restriction portion which restricts a depth with which the body portion enters between a body portion and a pressing portion of another pressure retaining member.

6. The pressure retaining member according to claim 5, comprising:

a first bending portion bent in one direction from the body portion;

a second bending portion bent in an opposite direction from the first bending portion at a portion extending from the first bending portion;

a third bending portion bent in a same direction as the first bending portion from the body portion; and an opposing portion extending from the third bending portion to a position opposing an upper surface of the optical element, wherein the pressing portion extends from the first bending portion, includes the second bending portion, is formed in an L shape in a side view, and presses a side surface of the optical element, a first slit is formed at a portion ranging from the first bending portion to the third bending portion in the body portion and a portion extending from the third bending portion in the opposing portion, the pressing portion includes an extending portion extending toward an end portion of the first slit on a side of the opposing portion, the extending portion is inserted into the end portion of the first slit on the side of the opposing portion or is provided while having an interval smaller than a thickness of the metal plate provided between the extending portion and the end portion of the first slit on the side of the opposing portion, and the extending portion is the restriction portion.

7. A laser scanning unit, comprising:

an optical element which guides beam light to be scanned to an image-carrying member;

a housing including a retaining portion which retains the optical element; and the pressure retaining member according to claim 1 which presses the optical element to retain the optical element in the retaining portion, wherein the laser scanning unit exposes a surface of the image-carrying member to form an electrostatic latent image.

* * * * *